US008824024B2

(12) United States Patent
Kuno (10) Patent No.: US 8,824,024 B2
(45) Date of Patent: Sep. 2, 2014

(54) IMAGE READING DEVICE CAPABLE OF DETERMINING WHETHER SHEET IS PRESENT AT READING POSITION

(71) Applicant: Brother Kogyo Kabushiki Kaisha, Aichi (JP)

(72) Inventor: Takeshi Kuno, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 13/801,727

(22) Filed: Mar. 13, 2013

(65) Prior Publication Data

US 2013/0286448 A1  Oct. 31, 2013

(30) Foreign Application Priority Data

Apr. 27, 2012  (JP) ................. 2012-103552

(51) Int. Cl.
*H04N 1/04* (2006.01)
*G06F 3/12* (2006.01)
*G06K 15/00* (2006.01)
*G06K 15/02* (2006.01)
*H04N 1/46* (2006.01)
*G03B 27/00* (2006.01)
*G01N 21/86* (2006.01)

(52) U.S. Cl.
USPC ........... 358/475; 358/1.13; 358/497; 358/2.1; 358/504; 358/1.2

(58) Field of Classification Search
USPC ................. 358/475, 1.13, 497, 2.1, 504, 1.2; 355/407; 250/559.07
See application file for complete search history.

(56) References Cited

U.S. PATENT DOCUMENTS

| 7,830,564 | B2 * | 11/2010 | Harada et al. ................. 358/504 |
| 8,575,581 | B2 * | 11/2013 | Murosaki ................. 250/559.07 |
| 2006/0044543 | A1 * | 3/2006 | Mizubata et al. ............. 355/407 |
| 2007/0065037 | A1 | 3/2007 | Honda et al. |

(Continued)

FOREIGN PATENT DOCUMENTS

| JP | H11-041416 A | 2/1999 |
| JP | 2004-120425 A | 4/2004 |
| JP | 2009-016904 A | 1/2009 |
| JP | 4611160 B2 | 1/2011 |

*Primary Examiner* — Firmin Backer
*Assistant Examiner* — Rury Grisham
(74) *Attorney, Agent, or Firm* — Scully, Scott, Murphy & Presser, PC (57) ABSTRACT An image reading device includes a reading unit having a light-receiving unit and a light-emitting unit emitting a plurality of lights of different colors toward a reading position. An opposing member is disposed opposite the reading unit with the reading position interposed therebetween. The controller controls the light-emitting unit to emit the lights and the light-receiving unit to receive the lights thereby acquiring an intensity of each light. The controller determines that a sheet is not present when relationships among intensities of the plurality of lights are same as the first intensity relationships. The first intensity relationships are defined by intensities of the plurality of lights reflected by the opposing member and received by the light-receiving unit. The first intensity relationships are different from intensity relationships of the plurality of lights reflected by a sheet present at the reading position and received by the light-receiving unit.

11 Claims, 7 Drawing Sheets

(56) References Cited

U.S. PATENT DOCUMENTS

| | | | |
|---|---|---|---|
| 2007/0273927 A1* | 11/2007 | Misaizu et al. | 358/2.1 |
| 2008/0174836 A1* | 7/2008 | Yoshihisa | 358/497 |
| 2009/0080031 A1* | 3/2009 | Ishido et al. | 358/449 |
| 2010/0302608 A1* | 12/2010 | Nagasaka | 358/475 |
| 2011/0211235 A1* | 9/2011 | Osakabe et al. | 358/475 |
| 2011/0222077 A1* | 9/2011 | Genda | 358/1.2 |
| 2012/0057211 A1* | 3/2012 | Shirado | 358/475 |
| 2013/0188210 A1* | 7/2013 | Mukaiyama | 358/1.13 |

* cited by examiner

IMAGE READING DEVICE CAPABLE OF DETERMINING WHETHER SHEET IS PRESENT AT READING POSITION

CROSS REFERENCE TO RELATED APPLICATION

This application claims priority from Japanese Patent Application No. 2012-103552 filed Apr. 27, 2012. The entire content of the priority application is incorporated herein by reference.

TECHNICAL FIELD

The present invention relates to an image reading device.

BACKGROUND

An image-reading device known in the art has an image-reading unit for reading an image from a sheet of an original at a read position. The image-reading device conveys the sheet relative to the image-reading unit, and the image-reading unit reads an image from the sheet as the sheet passes through the read position. This type of image-reading device determines whether a sheet is present at the read position and uses these determination results to set a read timing for the image-reading unit and an image size of the sheet within the scanned image, for example.

SUMMARY

One such image-reading device that has been proposed includes a pressing plate disposed opposite the image-reading unit. On the pressing plate is depicted a prescribed pattern, which serves as an identification image. The image-reading device determines that a sheet is present at the read position by detecting when image data read by the image-reading unit differs from data representing the identification image.

However, in the conventional image-reading device described above, the identification image depicted on the pressing plate can adversely affect the image read by the image-reading unit at the read position. Further, the conventional image-reading device might incorrectly determine the presence of a sheet at the read position if the identification image has deteriorated or become soiled.

In view of the foregoing, it is an object of the present invention to provide an image-reading device capable of detecting the presence of a sheet at the read position when no identification image is depicted on the pressing plate or other member opposing the image-reading unit, or capable of preventing incorrect determinations regarding the presence of a sheet at the read position when an identification image is depicted on the opposing member.

In order to attain the above and other objects, the invention provides an image reading device including a moving unit, a reading unit, an opposing member, and a controller. The moving unit is configured to make relative movements of a sheet with respect to a predetermined reading position to move the sheet in a predetermined direction. The reading unit is configured to read an image from the sheet disposed at the predetermined reading position. The reading unit includes a light-emitting unit and a light-receiving unit. The light-emitting unit is configured to emit a plurality of lights of different colors toward the predetermined reading position. The light-receiving unit is configured to receive a light. The opposing member is disposed opposite the reading unit with the predetermined reading position interposed therebetween. A distance between the reading unit and the opposing member is longer than a distance between the reading unit and the predetermined reading position. The controller is configured to: control the light-emitting unit to emit the plurality of lights and control the light-receiving unit to receive the plurality of lights, thereby acquiring an intensity of each of the plurality of lights received by the light-receiving unit; and determine whether or not a sheet is present at the predetermined reading position. The controller determines that the sheet is not present when relationships among intensities of the plurality of lights are same as the first intensity relationships. The controller determines that the sheet is present when relationships among intensities of the plurality of lights are different from the first intensity relationships. The first intensity relationships are defined by intensities of the plurality of lights that are emitted from the light-emitting unit, reflected by the opposing member, and received by the light-receiving unit. The first intensity relationships are different from second intensity relationships. The second intensity relationships are defined by intensities of the plurality of lights that are emitted from the light-emitting unit, reflected by a sheet present at the predetermined reading position and received by the light-receiving unit.

According to another aspect, the present invention provides a non-transitory computer readable medium storing a set of program instructions executed by an image reading device. The program instructions includes: controlling a light-emitting unit of a reading unit to emit a plurality of lights and controlling a light-receiving unit of the reading unit to receive the plurality of lights of different colors toward a predetermined reading position thereby acquiring an intensity of each of the plurality of lights received by the light-receiving unit, the reading unit configured to read an image from the sheet disposed at the predetermined reading position; making relative movements of a sheet with respect to the predetermined reading position to move the sheet; and determining whether or not a sheet is present at the predetermined reading position. A determination that the sheet is not present is made when relationships among intensities of the plurality of lights are same as the first intensity relationships. A determination that the sheet is present is made when relationships among intensities of the plurality of lights are different from the first intensity relationships. The first intensity relationships are defined by intensities of the plurality of lights that are emitted from the light-emitting unit, reflected by an opposing member, and received by the light-receiving unit. The first intensity relationships are different from second intensity relationships. The second intensity relationships are defined by intensities of the plurality of lights that are emitted from the light-emitting unit, reflected by a sheet present at the predetermined reading position and received by the light-receiving unit. The opposing member is disposed opposite the reading unit with the predetermined reading position interposed therebetween. A distance between the reading unit and the opposing member is longer than a distance between the reading unit and the predetermined reading position.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, a multifunction peripheral (MFP) 1 according to an embodiment of the present invention will be described while referring to FIGS. 1 through 7. The MFP 1 is an example of an image-reading device that has a plurality of functions, including a scanning function and copying function.

Electrical Structure of the MFP

Figure 1:
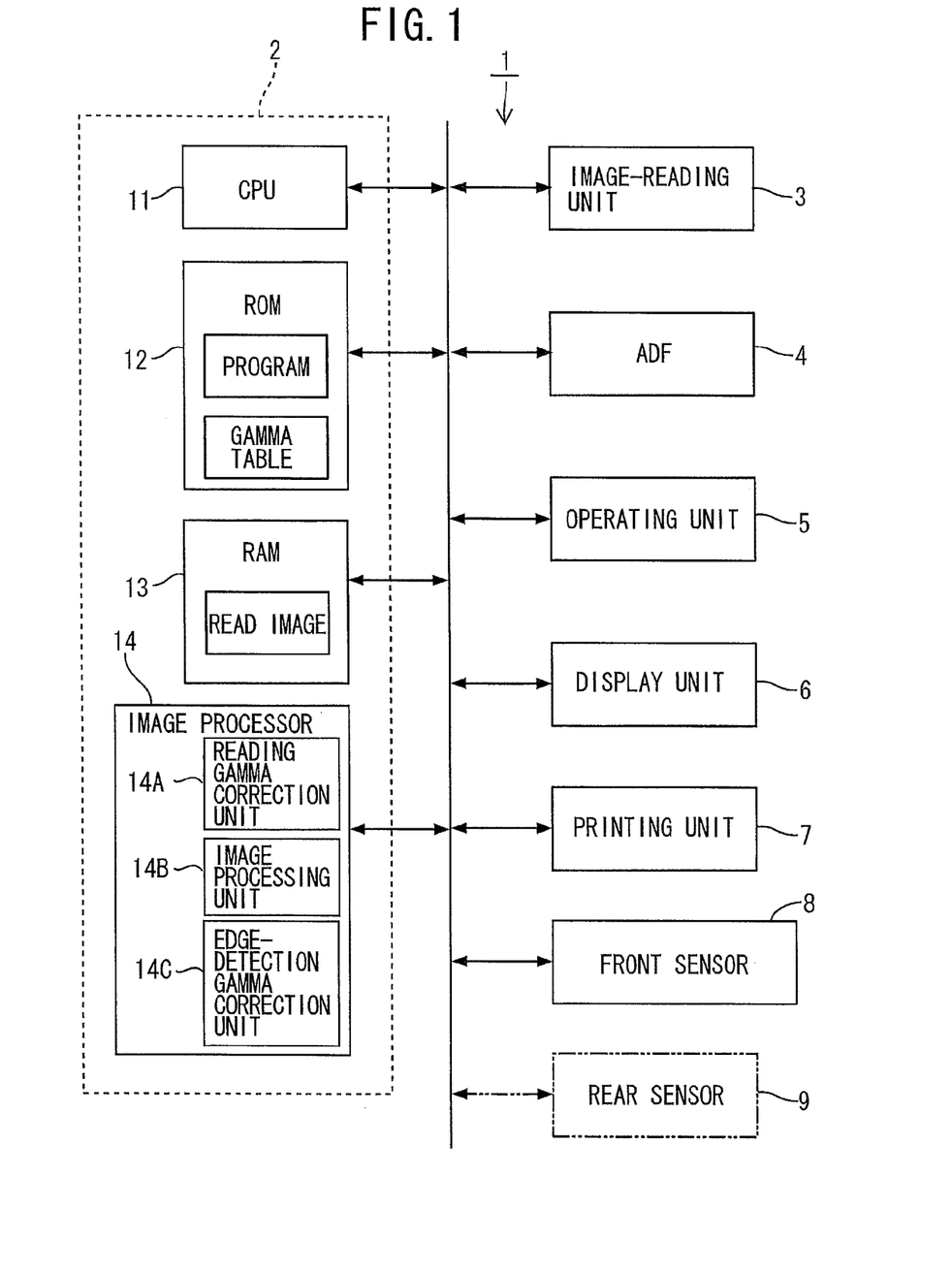
FIG. 1 is a block diagram showing an image reading device according to an embodiment of the present invention.

As shown in FIG. 1, the MFP 1 includes a control unit 2, an image-reading unit 3, an automatic document feeder (ADF) 4, an operating unit 5, a display unit 6, a printing unit 7, and a front sensor 8.

The control unit 2 also possesses a central processing unit (CPU) 11, a ROM 12. a RAM 13, and an image processor 14. The ROM 12 stores a program for executing a read control process described later, programs for executing various operations on the MFP 1, and the like. The CPU 11 controls the components of the MFP 1 based on programs read from the ROM 12. The various programs mentioned above may be stored on a medium other than the ROM 12 or RAM 13, including nonvolatile memory, such as a CD-ROM, hard disk drive, or flash memory (registered trademark).

The RAM 13 stores scan data for an image read by the image-reading unit 3. More specifically, the image-reading unit 3 produces light reception data for rows of pixels based on the scanned image, an A/D conversion unit (not shown) converts this analog data to a digital form, and the image-processing unit 14 processes the data through shading compensation and the like before the resulting data is stored in the RAM 13.

The image-processing unit 14 is a hardware circuit that includes a normal reading gamma correction unit 14A, an image processing unit 14B, and an edge-detection gamma correction unit 14C. The reading gamma correction unit 14A generates scan data from the image by performing a gamma correction process on the digital data produced from the analog light reception data while referencing a first gamma table γ1 stored in the ROM 12, for example. The image processing unit 14B executes various image processes on the scan data generated by the reading gamma correction unit 14A, such as filter processes and color conversion. The edge-detection gamma correction unit 14C generates edge detection data by performing a gamma correction process on the digital data produced from the analog light reception data while referencing a second gamma table γ2 having smaller gamma values than the values in the first gamma table γ1.

The operating unit 5 includes a plurality of buttons that enable the user to perform input operations. The display unit 6 has a liquid crystal display, LED lamps, and the like for displaying various option screens and the operating status of the device, for example. The printing unit 7 prints images based on the scan data or other image data on blank sheets (not shown) according to an electrophotographic or inkjet method, for example. The image-reading unit 3, ADF 4, and front sensor 8 will be described later.

Figure 2:
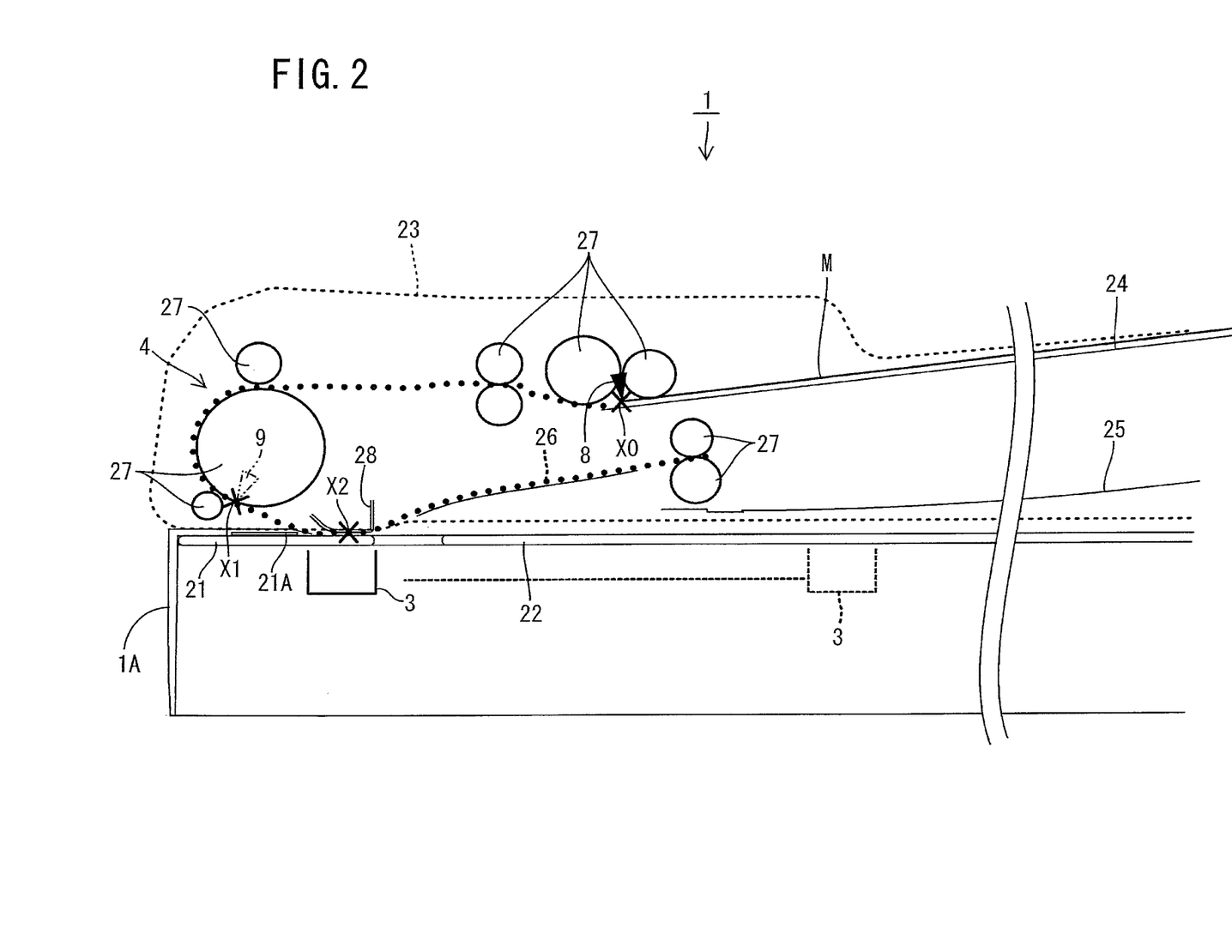
FIG. 2 is a cross-sectional diagram showing the image reading device.

As shown in FIG. 2, the MFP 1 has a body casing 1A accommodating the printing unit 7 and the image-reading unit 3. On the top surface of the body casing 1A are provided an ADF glass 21, and a flatbed glass 22. A cover 23 is provided on the top surface of the body casing 1A for covering the ADF glass 21 and flatbed glass 22 and is capable of opening and closing about one edge of the body casing 1A. The ADF 4 and front sensor 8 described above are provided inside the cover 23, and the image-reading unit 3 is provided below the ADF glass 21.

The cover 23 is also provided with a first tray 24 for supporting sheets M of an original to be scanned, and a second tray 24 disposed below the first tray 24 and receiving the sheets M after the scanning operation is performed. The front sensor 8 is provided on one end of the first tray 24 at a detection position X0. The front sensor 8 detects the presence of sheets M in the first tray 24 and transmits these detection results to the control unit 2.

A conveying path 26 is formed inside the cover 23. The conveying path 26 is U-shaped and serves to convey the sheets M from the first tray 24 to the second tray 24. The ADF 4 includes a plurality of conveying rollers 27 and a pressing member 28 that are disposed along the conveying path 26. The conveying rollers 27 are driven to rotate in order to convey the sheets M along the conveying path 26. The pressing member 28 has an opposing surface opposite to the image-reading unit 3. Color of opposing surface is white. The ADF 4 is configured to make relative movements of a sheet M with respect to a reading position X2 to move the sheet M in a conveying direction Y1.

The image-reading unit 3 is a reading device possessing a compact image sensor (CIS). Note that the image-reading unit 3 may be configured of a charge-coupled drive (CCD) image sensor and is not limited to a CIS. Further, a moving mechanism (not shown) is provided for moving the image-reading unit 3 left and right in FIG. 2 along a path parallel to the ADF glass 21 and flatbed glass 22.

The moving mechanism (not shown) moves the image-reading unit 3 to a position directly beneath the pressing member 28 for reading a sheet M conveyed by the ADF 4. The image-reading unit 3 reads the image on the sheet M and transmits scan data corresponding to the image to the control unit 2. The position on the conveying path 26 between the pressing member 28 and image-reading unit 3 and above the ADF glass 21 is the reading position X2 for this operation.

Detailed Description of the Image-Reading Unit

Figure 3:
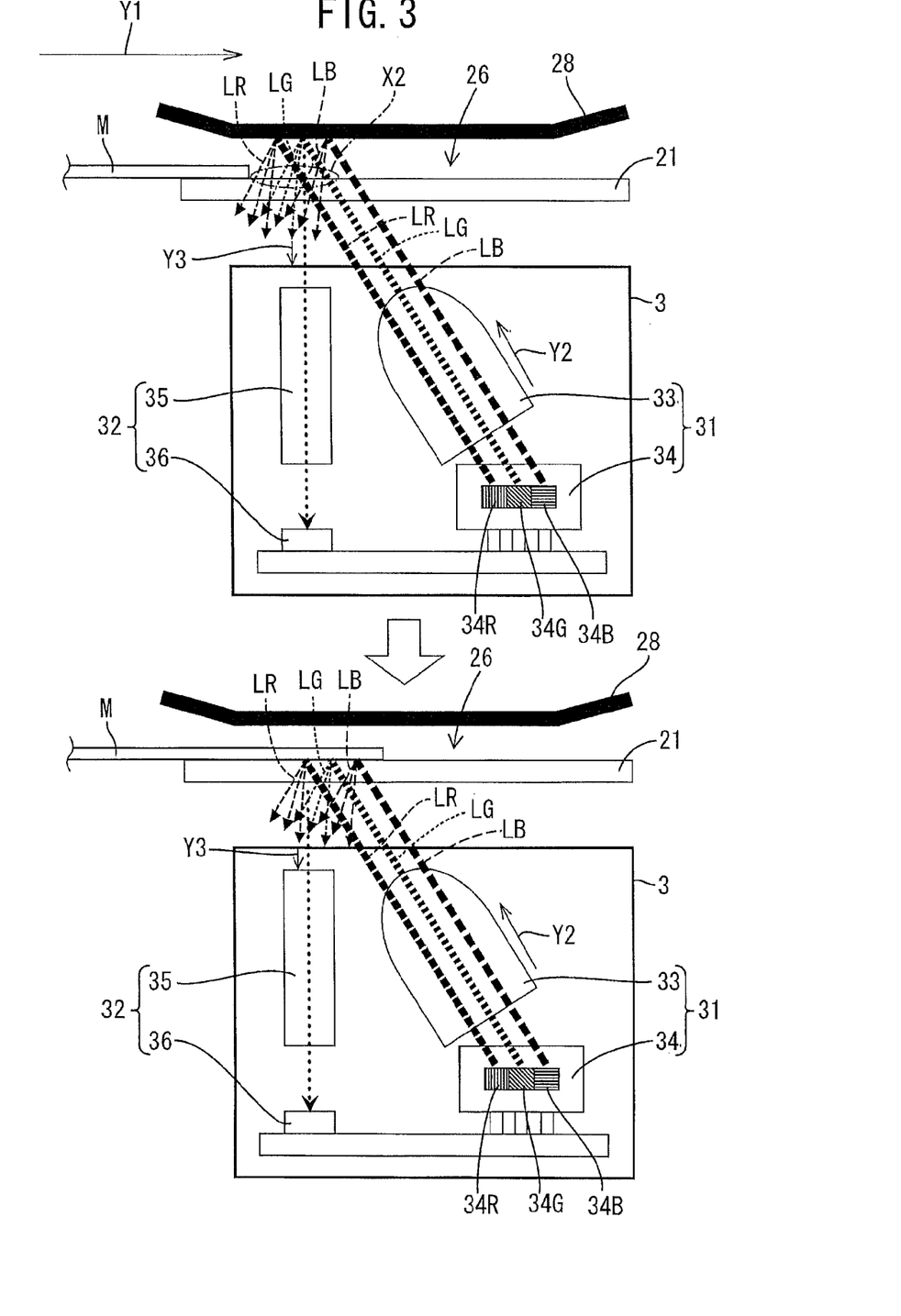
FIG. 3 is an explanatory diagram showing position relationships between a light-emitting unit and a light-receiving unit included in the image reading device.

As shown in FIG. 3, the image-reading unit 3 includes a light-emitting unit 31, and a light-receiving unit 32. The light-emitting unit 31 emits light in a plurality of colors that is reflected off the pressing member 28 when a sheet is not present at the reading position X2 and that is reflected off a sheet M when the sheet M is present at the reading position X2, and is received by the light-receiving unit 32. The relationships among light intensities of light received for the plurality of colors when a sheet is absent (hereinafter referred to as light reception relationships when a sheet is absent) differ from the relationships among light intensities of light received for the plurality of colors when the sheet M is present (hereinafter referred to as light reception relationships when a sheet is present). Note that the image-reading unit 3 of the embodiment is configured such that the light-receiving unit 32 does not receive light reflected specularly off the pressing member 28 or the sheet M, but receives light reflected diffusely. Also, light rays LR, LG, and LB for respective colors red (R), green (G), and blue (B) are depicted with different types of lines in FIG. 3 to aid in distinguishing them, and the range of the reading position X2 is exaggerated.

More specifically, the light-emitting unit 31 includes a light tube 33 and a light-emitting diode (LED) circuit board 34. A red LED 34R for emitting the red light ray LR, a green LED 34G for emitting the green light ray LG, and a blue LED 34B for emitting the blue light ray LB are arranged in the LED circuit board 34 and juxtaposed along the conveying direction Y1 of the conveying path 26 shown in FIG. 3. The light tube 33 is an optical member that serves to guide the light rays LR, LG, and LB from the respective LEDs 34R, 34G, and 34B toward the read position along a prescribed outgoing direction Y2.

The light-receiving unit 32 includes a receiver lens 35, and a light-receiving circuit board 36. The receiver lens 35 is an optical member for guiding light from the side nearest the reading position X2 toward the light-receiving circuit board 36. The light-receiving circuit board 36 includes a plurality of light-receiving elements (not shown) aligned in a direction orthogonal to the surface of FIG. 2, which will be called the main scanning direction. The outgoing direction Y2 of the light rays LR, LG, and LB is sloped relative to an opposing direction Y3 in which the light-receiving unit 32 opposes the pressing member 28. In the preferred embodiment, the opposing direction Y3 is orthogonal to the surface of the pressing member 28 that opposes the light-receiving unit 32 and the surface of the ADF glass 21.

As shown in FIG. 2, a white reference plate (white seal) 21A is provided on the top surface of the ADF glass 21 and is offset from the position directly beneath the pressing member 28. By moving the image-reading unit 3 (light-receiving unit 36) directly beneath the white reference plate 21A and adjusting the electric current supplied to the LEDs 34R, 34G, and 34B and the lighting time based on light reception data, the control unit 2 adjusts the intensities of light emitted by the LEDs 34R, 34G, and 34B while performing a read operation on the white reference plate 21A in order that the quantities of light received by the light-receiving unit 32 are uniform. The distance between the image-reading unit 3 and the white reference plate 21A is equivalent to that between the image-reading unit 3 and the reading position X2. Accordingly, the light reception relationships when a sheet is present indicate uniform light intensities for the light rays LR, LG, and LB, as shown in the bottom portion of FIG. 3, i.e., substantially equal pixel values.

The surface of the pressing member 28 opposing the light-receiving unit 32, on the other hand, is farther away from the image-reading unit 3 than the reading position X2. In other words, a distance between the image-reading unit 3 and the pressing member 28 is longer than a distance between the image-reading unit 3 and the reading position X2. Since the outgoing direction Y2 of the light rays LR, LG, and LB is slanted relative to the opposing direction Y3, the light-receiving unit 32 receives less light from the green light ray LG than the blue light ray LB, and less light from the red light ray LR than the green light ray LG, as indicated in the top of FIG. 3. Thus, the light reception relationships when a sheet is absent are LR<LG<LB, differing from the light reception relationships when a sheet is present. Hence, an image read from the pressing member 28 will have a bluish tone.

Read Control Process

Figure 4:
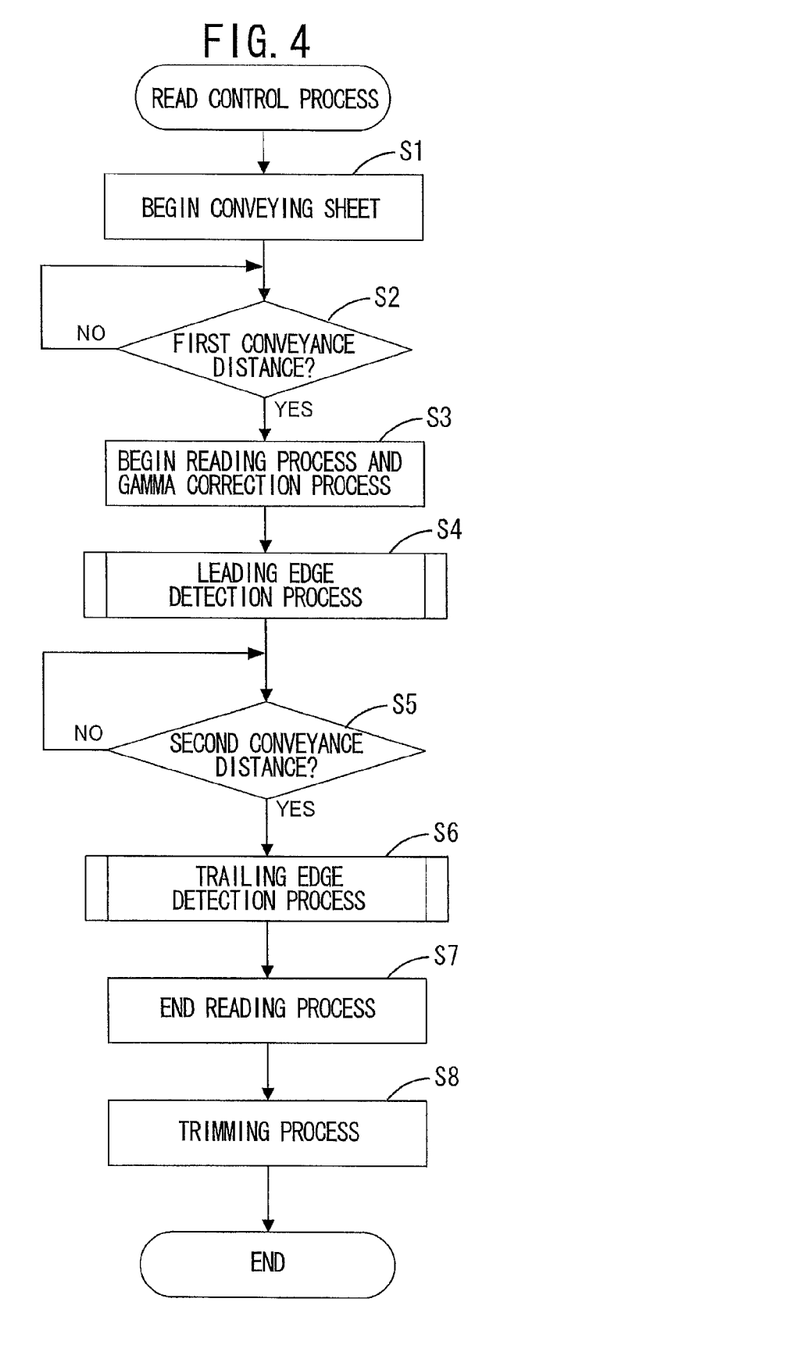
FIG. 4 is a flowchart illustrating steps in a read control process executed by the image reading device.

If the user performs an operation on the operating unit 5 to activate the read function, the control unit 2 executes the read control process shown in FIG. 4 when the control unit 2 determines that a sheet M is present in the first tray 24 based on detection results received from the front sensor 8. In the read control process, the control unit 2 determines whether the leading edge or the trailing edge of the sheet M has arrived at the reading position X2 based on whether the light intensity relationships among the light rays LR, LG, and LB received by the light-receiving unit 32 (hereinafter referred to as the light reception relationships at acquisition) matches the light reception relationships when a sheet is not present.

In S1 of the read control process in FIG. 4, the control unit 2 activates the ADF 4 to begin conveying the sheet M. In S2 the CPU 11 of the control unit 2 determines whether the sheet M has been conveyed a first distance. Various methods may be used to measure the conveying distance. In one method, the CPU 11 measures the conveying distance by counting the number of steps that a drive motor (not shown) rotates when driving the ADF 4 to rotate. In another method, the CPU 11 determines the conveying distance based on the elapsed time from the starting time of conveyance as measured by an internal timer, and a predetermined conveyance velocity. The first distance is the distance from the detection position X0 to a detection position X1 upstream of the reading position X2.

(1) Reading Process

After determining that the sheet M has been conveyed the first distance (S2: YES), in S3 the control unit 2 starts and continues a reading process. In this process, the LEDs 34R, 34G, and 34B of the image-reading unit 3 are controlled through time-sharing to emit light in their respective colors, and the image-reading unit 3 outputs light reception data for each main scan line. The light reception data for each main scan line is converted from analog to digital data and subjected to prescribed processes before being stored sequentially in the RAM 13. After the control unit 2 starts the reading process, the image-processing unit 14 begins executing a reading image process. During the reading image process, the reading gamma correction unit 14A performs gamma correction on the light reception data stored in the RAM 13 while referring to the first gamma table γ1, and the image processing unit 14B performs image processes, generating scan data representing the image. Gamma correction is performed to set the background in the image to white by correcting pixel values near the white pixel value to the white pixel value (hereinafter referred to as "whitening").

(2) Gamma Correction Process

After starting the reading process, the control unit 2 also executes an edge detection image process in parallel with the reading image process. In the edge detection image process, the edge-detection gamma correction unit 14C of the image-processing unit 14 performs gamma correction on the light reception data stored in the RAM 13 using the second gamma table γ2 to generate edge detection data, and stores this data in the RAM 13. Here, the effect of whitening when the gamma correction is performed with the second gamma table γ2 is smaller than that when the gamma correction is performed with the first gamma table γ1. Hence, the second gamma table γ2 renders a somewhat darker image than the first gamma table γ1. This process heightens the light intensity relationships among the light rays of different colors more so than gamma correction performed on the data with the same gamma table used during the reading image process, thereby improving the precision of determining the presence of the sheet M and detecting its edges.

(3) Leading Edge Detection Process

Figure 5:
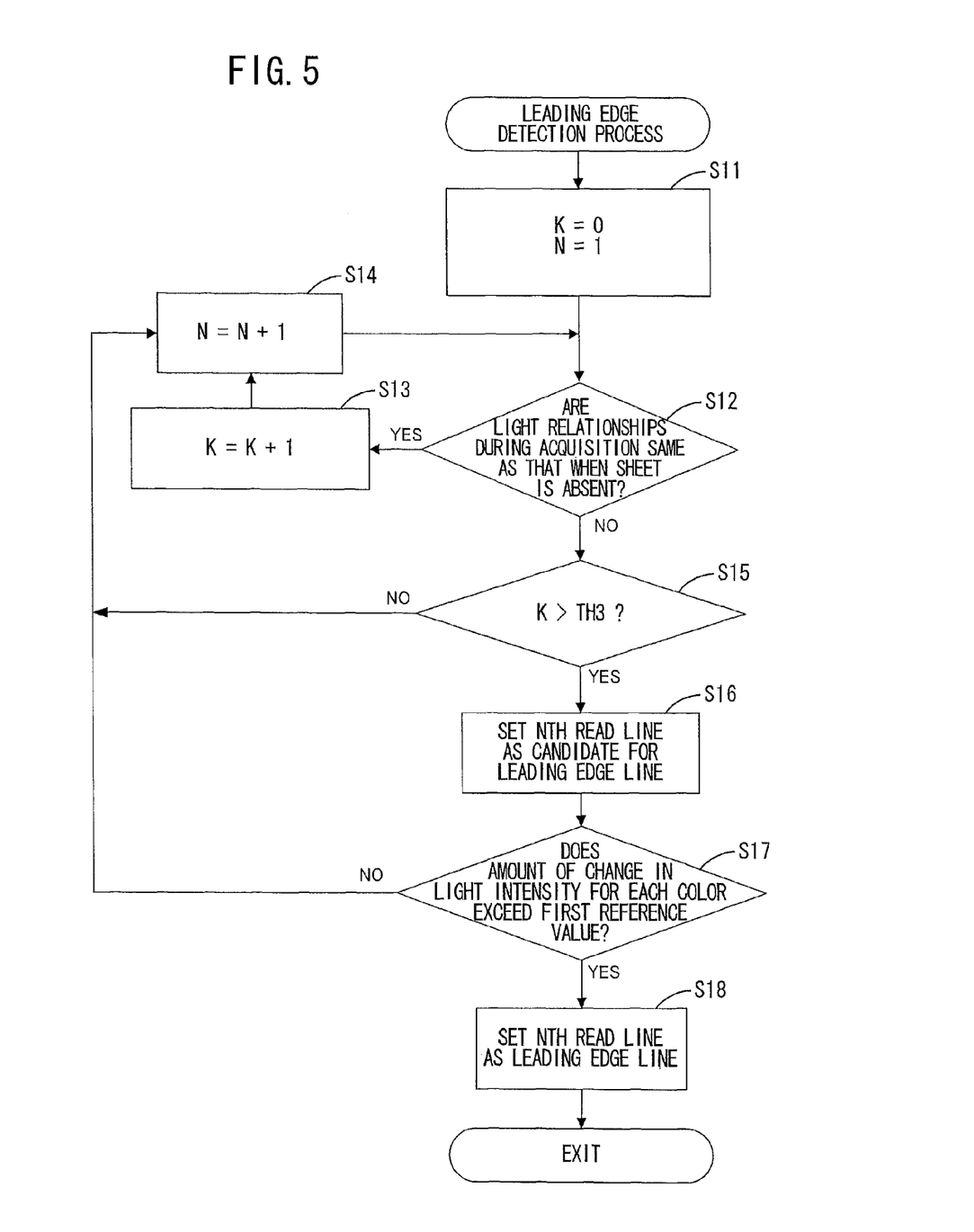
FIG. 5 is a flowchart illustrating steps in a leading edge detection process in the read control process of the read control process shown in FIG. 4.

In S4 the CPU 11 executes the leading edge detection process shown in FIG. 5. In S11 at the beginning of this process, the CPU 11 initializes a line number K to 0 and a read line number N to 1. The read line number N indicates a number of lines whose light relationships are determined whether or not the light relationships are the reference relationships. The line number K indicates a number of lines whose light relationships are determined as the reference relationships. In S12 the CPU 11 executes a sheet detection process to determine whether a sheet is present at the reading position X2. In the sheet detection process, the CPU 11 determines whether the light reception relationships during acquisition of the Nth read line are equivalent to the light reception relationships when a sheet is absent, based on the edge detection data described above. More specifically, the CPU 11 determines that the light reception relationships during acquisition are identical to those when a sheet is not present when Condition 1 below is satisfied.

$B(N)-G(N)>TH1$ $G(N)-R(N)>TH2$ Condition 1

Here, B(N) is the output value of the light-receiving element when the blue LED 34B emits light; G(N) is the output value of the light-receiving element when the green LED 34G emits light; and R(N) is the output value of the light-receiving element when the red LED 34R emits light. The "output value of the light-receiving element" is the average pixel value produced by some or all light-receiving elements arranged on the light-receiving circuit board 36. Further, thresholds TH1 and TH2 may be the same or different values. Suitable thresholds may be found in advance through experimentation, for example.

The CPU 11 determines that the sheet M is not present at the reading position X2 when the light reception relationships during acquisition match those when a sheet is not present (S12: YES). In this case, the CPU 11 increments the line number K by 1 in S13, increments the read line number N by 1 in S14, and returns to S12. As shown in the graph of FIG. 7, Condition 1 described above is met for all read lines prior to the sheet M arriving at the reading position X2.

Figure 7:
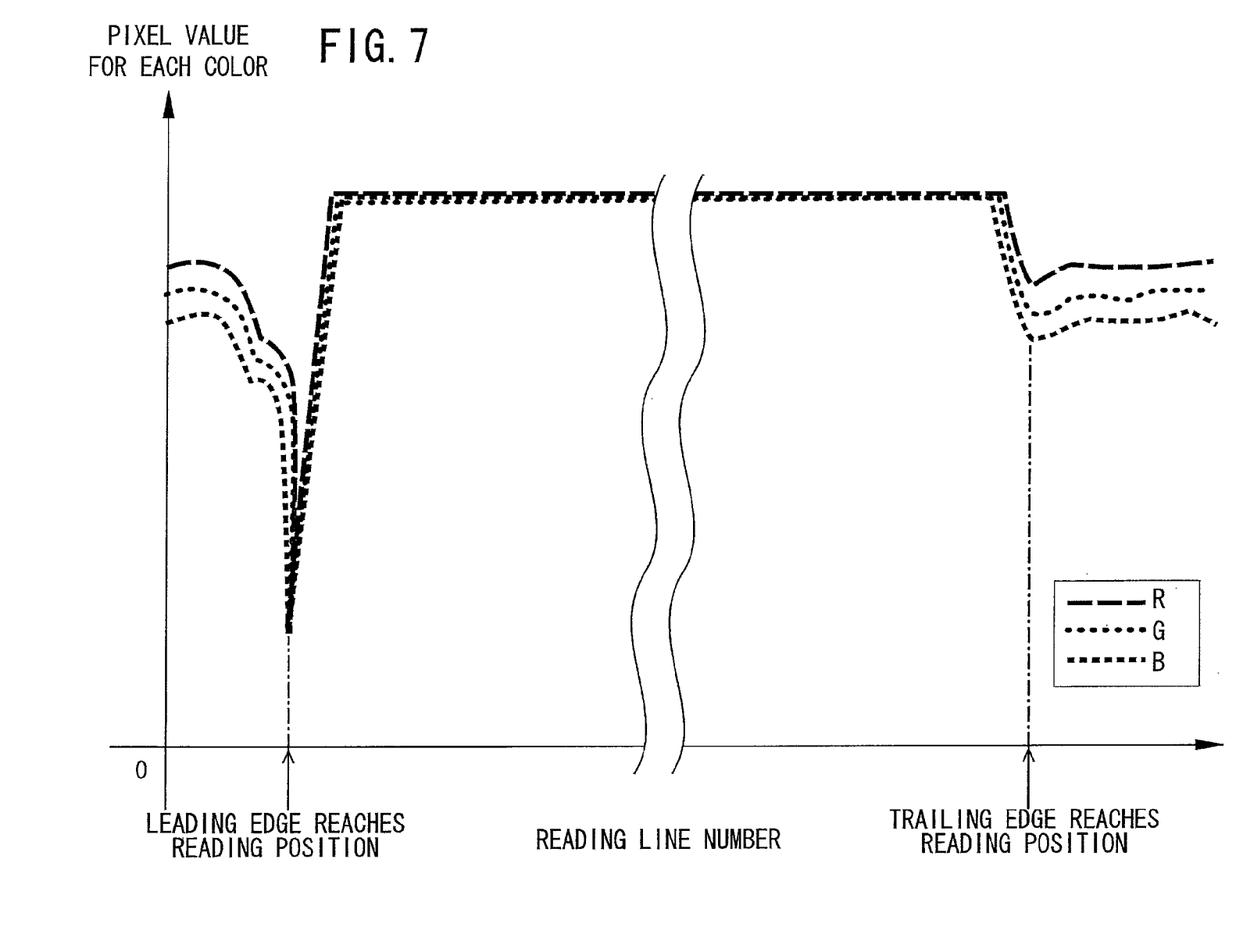
FIG. 7 is a graph illustrating relationships between pixel values and reading line numbers.

When the leading edge of the sheet M arrives at the reading position X2, the pixel values for each color change temporarily, then become substantially the same, as illustrated in FIG. 7. During this time, the light reception relationships during acquisition no longer match those when a sheet is absent. When the CPU 11 determines that the light reception relationships during acquisition are not equivalent to those when a sheet is absent (S12: NO), in S15 the CPU 11 determines whether the line number K is greater than a threshold TH3. If the line number K is greater than the threshold TH3 (S15: YES), in S16 the CPU 11 sets the Nth read line as a candidate for a leading edge line corresponding to the leading edge of the sheet M.

However, if the line number K is less than or equal to the threshold TH3 (S15: NO), the CPU 11 returns to S14, even after determining in S12 that the light reception relationships during acquisition do not match the relationships when a sheet is absent (S12: NO). In other words, if the line number K is not greater than the threshold TH3, the CPU 11 determines that the leading edge of the sheet M has not arrived at the reading position X2 and that the changes in light reception relationships are due to noise or the like.

After setting the Nth read line as a candidate for the leading edge line in S16, in S17 the CPU 11 executes a first change-determining process for determining whether the amount of change in light intensity for each color exceeds a first reference value. Specifically, the CPU 11 determines that the change in light intensity for each color exceeds the first reference value when Condition 2 below is satisfied.

$(R(N)-R(N-H))/K>TH4$ $(G(N)-G(N-H))/K>TH5$ $(B(N)-B(N-H))/K>TH6$ Condition 2

Here, H is a prescribed interval between lines used for calculating the amount of change in light intensity. Further, thresholds TH4-TH6 are examples of the first reference value. These thresholds may be set to the same value or different values. Suitable thresholds may be found in advance through experimentation, for example.

If the CPU 11 determines that the change in light intensity for each color exceeds the corresponding first reference value (S17: YES), the CPU 11 determines that the leading edge of the sheet M has arrived at the reading position X2. Thus, in S18 the CPU 11 sets the Nth read line as the definitive leading edge line, then ends the current leading edge detection process and returns to S5 in FIG. 4. However, if the CPU 11 determines that the amount of change in light intensity for at least one color does not exceed the corresponding first reference value (S17: NO), then the CPU 11 determines that the leading edge of the sheet M has not reached the reading position X2. Accordingly, the CPU 11 returns to S14 without setting the Nth read line as an edge line.

After completing the leading edge detection process in FIG. 5, in S5 of FIG. 4 the control unit 2 determines whether the sheet M has subsequently been conveyed a second distance. To make this determination, the CPU 11 may continue counting the number of read lines following detection of the leading edge in S4 and may determine that the sheet M has been conveyed the second distance when the count reaches a prescribed number. Once the control unit 2 determines that the sheet M has been conveyed the second distance (S5: YES), in S6 the control unit 2 executes the trailing edge detection process shown in FIG. 6.

(4) Trailing Edge Detection Process

Figure 6:
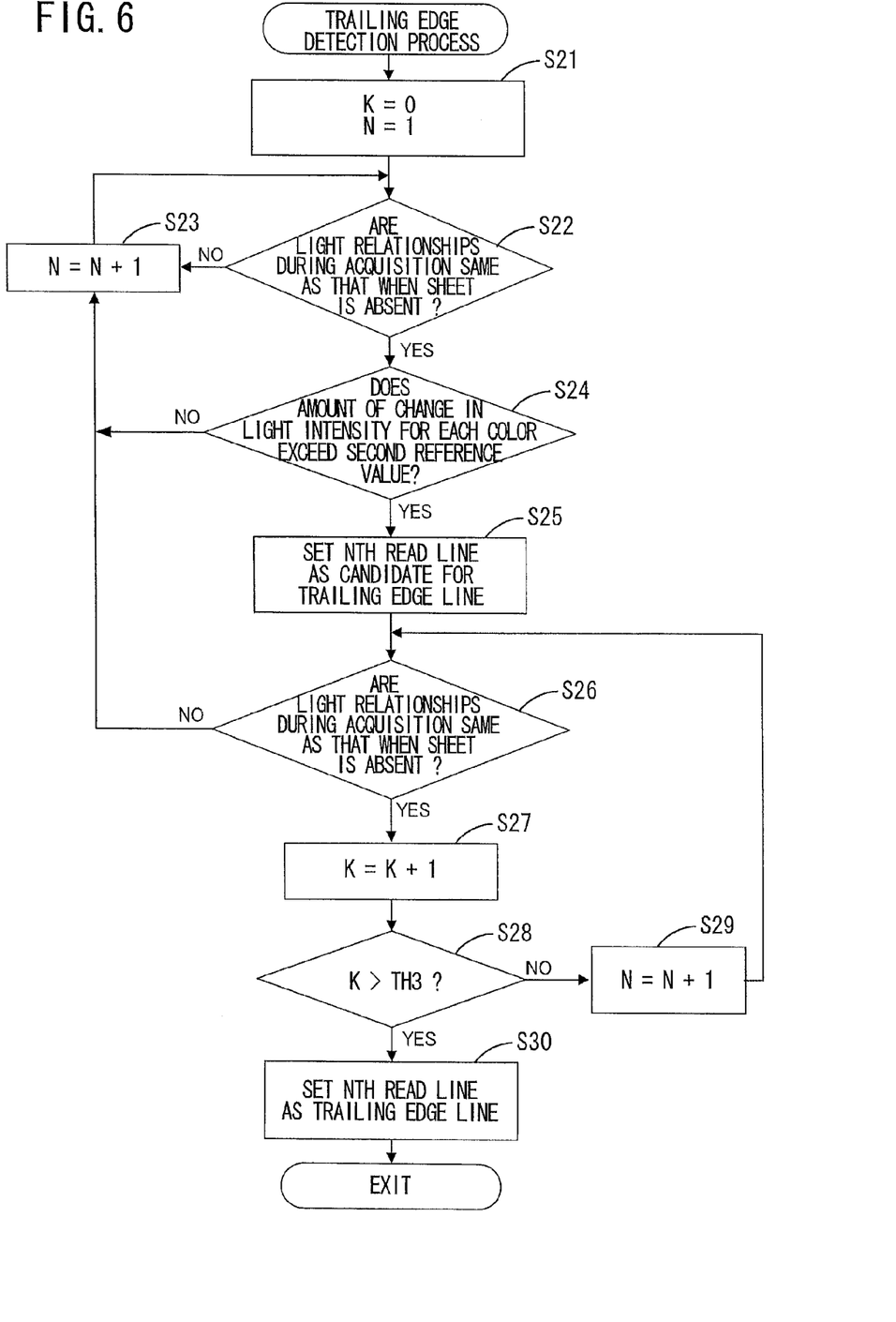
FIG. 6 is a flowchart illustrating steps in a trailing edge detection process in the read control process of the read control process shown in FIG. 4.

In S21 the CPU 11 initializes the line number K to 0 and the read line number N to 1. In S22 the CPU 11 executes the sheet detection process to determine whether a sheet is present at the reading position X2. The CPU 11 performs this process according to the same method described in S12 of FIG. 5 by determining whether the light reception relationships during acquisition of the Nth read line is the same as that when a sheet is absent, based on the edge detection data. If the CPU 11 determines that the light reception relationships during acquisition are not equivalent to those when a sheet is absent (S22: NO), then the CPU 11 determines that the sheet M is present at the reading position X2. Accordingly, in S23 the CPU 11 increments the read line number N by 1 and returns to S22.

When the trailing edge of the sheet M reaches the reading position X2, Condition 1 described earlier is satisfied, as illustrated in FIG. 7. Hence, the CPU 11 determines that the light reception relationships during acquisition are equivalent to those when a sheet is absent (S22: YES) and in S24 executes a second change-determining process similar to that described in S17 of FIG. 5 for determining whether the amount of change in light intensity for each color exceeds corresponding second reference values. Here, thresholds TH4-TH6 used in S24 are examples of the second reference values and may be the same values used in S17 or different values. If the CPU 11 determines that the amount of change in light intensity for at least one color is less than or equal to the corresponding second reference value (S24: NO), then the CPU 11 determines that the trailing edge of the sheet M has not arrived at the reading position X2 and that the changes in light reception relationships are due to the effects of noise, for example. Accordingly, the CPU 11 returns to S23.

If the CPU 11 determines that the amount of change in light intensity for each color exceeds the corresponding second reference values (S24: YES), in S25 the CPU 11 sets the Nth read line as a candidate for a trailing edge line corresponding to the trailing edge of the sheet M. Since the CPU 11 has already determined in S22 that the light reception relationships during acquisition of the Nth read line are equivalent to light reception relationships when a sheet is absent (S26: YES), in S27 the CPU 11 increments the line number K by 1. In S28 the CPU 11 determines whether the line number K is greater than the threshold TH3. If the line number K is not greater than the threshold TH3 (S28: NO), in S29 the CPU 11 increments the read line number N by 1 and returns to S26. If the light reception relationships during acquisition are found to no longer equal those light reception relationships when a sheet is absent (S26: NO) before the line number K becomes greater than the threshold TH3, then the CPU 11 cancels the previously set candidate for the trailing edge line and returns to S23.

However, if the line number K is found to exceed the threshold TH3 (S28: YES), the CPU 11 determines that the trailing edge of the sheet M has arrived at the reading position X2. Accordingly, in S30 the CPU 11 definitively sets the Nth read line as the trailing edge line, ends the trailing edge detection process, and returns to S7 in FIG. 4. In S7 the control unit 2 ends the current reading process and, before ending the current read control process, executes a trimming process in S8 on the scanned image represented by scan data acquired in the reading image process. In this process, the control unit 2 trims off the portion of the scanned image from the first line to the detected leading edge line and the portion from the detected trailing edge line to the final line.

Effects of the Embodiment

The MFP 1 of the preferred embodiment is configured such that the light reception relationships when a sheet is absent differ from the light reception relationships when a sheet is present. In other words, the relationships among intensities of light received for the plurality of colors when light emitted from the light-emitting unit 31 is reflected off the pressing member 28 and received by the light-receiving unit 32 (reference relationships) differs from the relationships among intensities of light received for the plurality of colors when light emitted from the light-emitting unit 31 is reflected off a sheet M present at the reading position X2 and received by the light-receiving unit 32. This difference in light reception relationships is used to determine whether a sheet is present at the reading position X2. Specifically, the MFP 1 determines that the sheet M is not present at the reading position X2 when the light reception relationships during acquisition are equivalent to those when a sheet is absent, and determines that the sheet M is present at the reading position X2 when the light reception relationships during acquisition differ from those when a sheet is absent. In this way, the MFP 1 can determine whether the sheet M is present at the reading position X2 without an identification image depicted on the pressing member 28. Alternatively, if the pressing member 28 is provided with an identification image, the MFP 1 could suppress incorrect determinations regarding whether the sheet M is present at the reading position X2.

The LEDs 34R, 34G, and 34B are provided at different positions (offset position) in the conveying direction Y1, and the outgoing directions Y2 of light rays LR, LG, and LB outputted from the LEDs 34R, 34G, and 34B are parallel to one another and sloped relative to the opposing direction Y3 in which the pressing member 28 opposes the light-receiving unit 32. Each of the light rays LR, LG, and LB are reflected by the pressing member 28 at respective one of a plurality of reflect positions. The reflect positions are different from one another in the conveying direction Y1 as shown in FIG. 3. With this construction, the difference in relationships among light intensities of light received for the plurality of colors is more pronounced than in a configuration in which the conveying directions of the light rays LR, LG, and LB are not parallel to one another, enabling the MFP 1 to determine the presence of the sheet M with greater accuracy.

Further, the MFP 1 determines whether the leading edge of the sheet M has arrived at the reading position X2, not only by determining when the light reception relationships change from those indicating that a sheet M is absent to those indicating that a sheet M is present (S12), but also by determining whether the intensity of light for each color has changed an amount exceeding the first reference value (S17). With this method, the MFP 1 can determine whether the leading edge of the sheet M has arrived at the reading position X2 with greater accuracy than when simply using determination results indicating the presence of the sheet.

Further, the MFP 1 determines whether the trailing edge of a sheet M has arrived at the reading position X2, not only by determining when the light reception relationships change from those indicating that a sheet M is present to those indicating that a sheet M is absent (S22), but also by determining whether the intensity of light for each color has changed an amount exceeding the threshold value (S24). With this method, the MFP 1 can determine whether the trailing edge of the sheet M has arrived at the reading position X2 with greater accuracy than when simply using determination results indicating the presence of the sheet.

Further, since the light intensities for each color of light are uniform in light reception relationships indicating that a sheet is present, the MFP 1 can read the image from an original with greater precision than when the light intensities are nonuniform. Further, by determining that the sheet M is absent when the differences in light intensities of all colors exceed corresponding thresholds, the MFP 1 can determine accurately whether the sheet is present.

Further, the surface of the pressing member 28 that opposes the image-reading unit 3 is white. Unlike an opposing surface that is not white, such as an opposing surface with an identification image depicted thereon, a white opposing surface does not influence an image scanned by the image-reading unit.

While the invention has been described in detail with reference to the embodiment thereof, it would be apparent to those skilled in the art that various changes and modifications may be made therein without departing from the spirit of the invention.

While the image-reading device in the embodiment is the MFP 1, the image-reading device according to the present invention may be a standalone scanner having only a scanning function or a facsimile device, for example.

In the embodiment, the control unit 2 is configured to execute the read control process using the CPU 11 and image processor 14. However, the control unit 2 may be provided with a plurality of CPUs for executing the read control process, or may execute the process using only a hardware circuit, such as an application-specific integrated circuit. Further, the control unit 2 may be configured such that the CPU 11 executes at least part of the read control process.

In the embodiment described above, the ADF 4 is used as an example of a moving unit. However, the MFP 1 may be configured with a flatbed type scanner in which the image-reading unit 3 is moved relative to the sheet M while the sheet M remains stationary on the flatbed glass 22.

In the embodiment, the pressing member 28 serves as an opposing member that opposes the image-reading unit 3 and has a white opposing surface. However, the opposing member may be a reference member used for shading compensation, for example. Further, the opposing member need not be white, but may be gray, for example. However, when the color of the opposing surface on the opposing member is identical or similar to the background of the sheet M, the relationships among light intensities of RGB light will differ greatly depending on whether a sheet M is present or absent, enabling the MFP 1 to determine whether a sheet M is present with accuracy.

In the embodiment, the light-emitting unit 31 is configured to emit light rays LR, LG, and LB in the three colors red, green, and blue. However, the light-emitting unit 31 may be configured to emit light in the three colors yellow (Y), magenta (M), and cyan (C), for example. Alternatively, the light-emitting unit 31 may emit light in two colors, or four or more colors. Further, the LEDs 34R, 34G, and 34B in the preferred embodiment are arranged at positions offset in the conveying direction Y1. However, the LEDs 34R, 34G, and 34B may be arranged at positions offset in a direction forming a prescribed angle with the conveying direction Y1. In addition, the order in which the LEDs 34R, 34G, and 34B are arranged may differ from that shown in FIG. 3.

In the embodiment, the light-emitting unit 31 of the image-reading unit 3 is disposed downstream of the light-receiving unit 32 in the conveying direction Y1. However, the light-emitting unit 31 may be disposed upstream of the light-receiving unit 32 instead. Further, the output directions of the light rays LR, LG, and LB need not be parallel to one another, provided that the light reception relationships among these colors differ depending on whether a sheet is present or absent.

A rear sensor 9 may also be provided in the MFP 1, as indicated by double chain lines in FIGS. 1 and 2, at the detection position X1 upstream of the reading position X2. With this configuration, the control unit 2 can determine whether the sheet M has been conveyed the first distance when the rear sensor 9 turns on.

In the edge detection image process of the embodiment, the control unit 2 performs a gamma correction process on the light reception data. However, rather than performing gamma correction on light reception data in the edge detection image process, the control unit 2 may simply execute the leading edge and trailing edge detection processes on the uncorrected data.

In the embodiment, the control unit 2 determines whether the leading edge or trailing edge of the sheet M has arrived at the reading position X2 based on whether the light reception relationships during acquisition are equivalent to those when a sheet is absent. However, the control unit 2 may execute the sheet detection process to determine whether the sheet M is present at the reading position X2 based on whether the light reception relationships during acquisition are equivalent to those when a sheet is not present, without executing the edge detection processes.

In the embodiment, the control unit 2 performs a leading edge detection process to determine whether the leading edge has arrived at the reading position X2, not only by determining whether the light reception relationships during acquisition have changed (S12: YES), but also by determining whether the amount of change in light intensity for each color exceeds a corresponding first reference value (S17: YES). However, the control unit 2 may determine whether the leading edge of the sheet M has arrived at the reading position X2 based on the determination results in the sheet detection process (S12), without executing the first change-determining process (S17).

In the embodiment, the control unit 2 performs a trailing edge detection process to determine whether the trailing edge has arrived at the reading position X2, not only by determining whether the light reception relationships during acquisition have changed (S22: YES), but also by determining whether the amount of change in light intensity for each color exceeds a corresponding second reference value (S24: YES). However, the control unit 2 may determine whether the trailing edge of the sheet M has arrived at the reading position X2 based on the determination results in the sheet detection process (S22), without executing the second change-determining process (S24).

What is claimed is:

1. An image reading device comprising:
    a moving unit configured to make relative movements of a sheet with respect to a predetermined reading position to move the sheet in a predetermined direction;
    a reading unit configured to read an image from the sheet disposed at the predetermined reading position, the reading unit including:
        a light-emitting unit configured to emit a plurality of lights of different colors toward the predetermined reading position; and
        a light-receiving unit configured to receive a light;
    an opposing member disposed opposite the reading unit with the predetermined reading position interposed therebetween, a distance between the reading unit and the opposing member being longer than a distance between the reading unit and the predetermined reading position; and
    a controller configured to:
        control the light-emitting unit to emit the plurality of lights and control the light-receiving unit to receive the plurality of lights, thereby acquiring an intensity of each of the plurality of lights received by the light-receiving unit; and
        determine whether or not a sheet is present at the predetermined reading position, the controller determining that the sheet is not present when relationships among intensities of the plurality of lights are same as the first intensity relationships, the controller determining that the sheet is present when relationships among intensities of the plurality of lights are different from the first intensity relationships, the first intensity relationships being defined by intensities of the plurality of lights that are emitted from the light-emitting unit, reflected by the opposing member, and received by the light-receiving unit, the first intensity relationships being different from second intensity relationships, the second intensity relationships being defined by intensities of the plurality of lights that are emitted from the light-emitting unit, reflected by a sheet present at the predetermined reading position and received by the light-receiving unit.

2. The image reading device according to claim 1, wherein the light-emitting unit includes a plurality of light-sources each emitting respective one of the plurality of lights, the plurality of light-sources being disposed at positions different from one another in the predetermined direction;
    wherein each of the plurality of lights is reflected by at least one of the opposing member and the sheet at respective one of a plurality of reflect positions, the plurality of reflect positions being different from one another in the predetermined direction.

3. The image reading device according to claim 1, wherein the controller starts and continues acquiring the intensities of the plurality of lights and determining whether or not the sheet is present at the predetermined reading position before the sheet reaches the predetermined reading position;

wherein the controller is further configured to decide that a leading edge of the sheet reaches the predetermined reading position when the controller determines that the sheet is present after the controller determined that the sheet is not present.

4. The image reading device according to claim 3, wherein the controller is further configured to judge whether or not an amount of change in intensity of each of the plurality of lights exceeds a reference value;
wherein, the controller decides that sheet reaches the predetermined reading position when both first condition and second condition are satisfied, the first condition being defined that the controller determines that the sheet is present after the controller determined that the sheet is not present, the second condition being that the controller judges that the amount of change in intensity of each of the plurality of lights exceeds the reference value.

5. The image reading device according to claim 1, wherein the controller starts and continues acquiring the intensities of the plurality of lights and determining whether or not the sheet is present at the predetermined reading position before the sheet reaches the predetermined reading position;
wherein the controller is further configured to decide that a trailing edge of the sheet reaches the predetermined reading position when the controller determines that the sheet is not present after the controller determined that the sheet is present.

6. The image reading device according to claim 5, wherein the controller is further configured to judge whether or not an amount of change in intensity of each of the plurality of lights exceeds a reference value;
wherein, the controller decides that the trailing edge of the sheet reaches the predetermined reading position when both first condition and second condition are satisfied, the first condition being defined that the controller determines that the sheet is not present after the controller determined that the sheet is present, the second condition being that the controller judges that the amount of change in intensity of each of the plurality of lights exceeds the reference value.

7. The image reading device according to claim 1, wherein the controller further acquires received-light data corresponding to an intensity of each of the plurality of lights received by the light-receiving unit;
wherein the controller is further configured to generate read data by executing a gamma correction on the received-light data by using a first gamma table; and
wherein the controller determines whether or not a sheet is present at the predetermined reading position by using the received-light data on which has not been performed the gamma correction.

8. The image reading device according to claim 1, wherein the controller further acquires received-light data corresponding to an intensity of each of the plurality of lights received by the light-receiving unit;
wherein the controller is further configured to generate read data by executing a gamma correction on the received-light data by using a first gamma table; and
wherein the controller determines whether or not a sheet is present at the predetermined reading position by using determination data, the determination data being acquired by performing the gamma correction on the received-light data based on a second gamma table, the second gamma table having a value smaller than a value of the first gamma value.

9. The image reading device according to claim 1, wherein the controller determines that the sheet is not present when each difference in intensity of light between one of the plurality of lights and another of the plurality of lights are greater than or equal to a predetermined threshold value.

10. The image reading device according to claim 1, wherein the opposing member has a surface whose color is white and opposing the image reading unit.

11. A non-transitory computer readable medium storing a set of program instructions executed by an image reading device, the program instructions comprising:
controlling a light-emitting unit of a reading unit to emit a plurality of lights and controlling a light-receiving unit of the reading unit to receive the plurality of lights of different colors toward a predetermined reading position thereby acquiring an intensity of each of the plurality of lights received by the light-receiving unit, the reading unit configured to read an image from the sheet disposed at the predetermined reading position;
making relative movements of a sheet with respect to the predetermined reading position to move the sheet; and
determining whether or not a sheet is present at the predetermined reading position, a determination that the sheet is not present being made when relationships among intensities of the plurality of lights are same as the first intensity relationships, a determination that the sheet is present being made when relationships among intensities of the plurality of lights are different from the first intensity relationships, the first intensity relationships being defined by intensities of the plurality of lights that are emitted from the light-emitting unit, reflected by an opposing member, and received by the light-receiving unit, the first intensity relationships being different from second intensity relationships, the second intensity relationships being defined by intensities of the plurality of lights that are emitted from the light-emitting unit, reflected by a sheet present at the predetermined reading position and received by the light-receiving unit, the opposing member being disposed opposite the reading unit with the predetermined reading position interposed therebetween, a distance between the reading unit and the opposing member being longer than a distance between the reading unit and the predetermined reading position.

* * * * *